(12) United States Patent
Kim

(10) Patent No.: US 11,444,288 B2
(45) Date of Patent: Sep. 13, 2022

(54) ELECTRODE COMPRISING ORGANIC FUNCTIONAL METAL OXIDE, MANUFACTURING METHOD THEREFOR, MEMBRANE-ELECTRODE ASSEMBLY COMPRISING SAME, AND FUEL CELL COMPRISING MEMBRANE-ELECTRODE ASSEMBLY

(71) Applicant: KOLON INDUSTRIES, INC., Seoul (KR)

(72) Inventor: Jung Ho Kim, Seoul (KR)

(*) Notice: Subject to any disclaimer, the term of this patent is extended or adjusted under 35 U.S.C. 154(b) by 280 days.

(21) Appl. No.: 16/323,400

(22) PCT Filed: Jun. 19, 2018

(86) PCT No.: PCT/KR2018/006888
§ 371 (c)(1),
(2) Date: Feb. 5, 2019

(87) PCT Pub. No.: WO2018/236119
PCT Pub. Date: Dec. 27, 2018

(65) Prior Publication Data
US 2020/0358108 A1 Nov. 12, 2020

(30) Foreign Application Priority Data
Jun. 18, 2018 (KR) .................. 10-2018-0069647

(51) Int. Cl.
*H01M 4/90* (2006.01)
*H01M 4/88* (2006.01)
(Continued)

(52) U.S. Cl.
CPC ....... *H01M 4/9016* (2013.01); *H01M 4/8828* (2013.01); *H01M 4/9008* (2013.01); *H01M 4/921* (2013.01); *H01M 8/1004* (2013.01)

(58) Field of Classification Search
CPC ............. H01M 4/9016; H01M 4/8828; H01M 4/9008; H01M 4/921; H01M 8/1004;
(Continued)

(56) References Cited

U.S. PATENT DOCUMENTS

| 7,537,857 B2 | 5/2009 | Andrews et al. |
| 9,054,355 B2 | 6/2015 | Querner et al. |

(Continued)

FOREIGN PATENT DOCUMENTS

| CN | 1305647 A | 7/2001 |
| CN | 101257116 A | 9/2008 |

(Continued)

OTHER PUBLICATIONS

Chinese office action dated May 7, 2021.
(Continued)

*Primary Examiner* — Christian Roldan
(74) *Attorney, Agent, or Firm* — Harvest IP Law, LLP

(57) ABSTRACT

The present invention relates to an electrode comprising organic functional metal oxides, a manufacturing method thereof, a membrane-electrode assembly including the same, and a fuel cell including the membrane-electrode assembly, and the electrode comprises a support, catalyst particles supported on the support, organic functional metal oxide nanoparticles supported on the support, and an ionomer positioned on the surface of the support.
The electrode improves catalyst performance and durability in a high voltage range, can reduce the amount of a catalyst used and catalyst costs by enabling excellent current density and power density to be obtained even in a state that a relatively small amount of the catalyst is used through an increase in catalyst utilization and uniform dispersion of the catalyst, and improves performance in general and low humidification conditions.

4 Claims, 10 Drawing Sheets

(51) Int. Cl.
  *H01M 4/92* (2006.01)
  *H01M 4/86* (2006.01)
  *H01M 8/10* (2016.01)
  *H01M 8/1004* (2016.01)

(58) Field of Classification Search
  CPC ............ H01M 4/86; H01M 4/88; H01M 4/90;
       H01M 4/926; H01M 4/8663; H01M
       8/1018; H01M 4/8892; H01M 4/8647;
       H01M 4/9075; H01M 4/8814; H01M
       2008/1095; Y02E 60/50; Y02P 70/50
  USPC ......................................................... 429/483
  See application file for complete search history.

(56) References Cited

U.S. PATENT DOCUMENTS

| | | | | |
|---|---|---|---|---|
| 2002/0004159 A1* | 1/2002 | Totsuka | ............. | H01M 8/1004 427/115 |
| 2004/0053060 A1 | 3/2004 | Roziere | | |
| 2014/0023952 A1* | 1/2014 | Yim | .................... | H01M 4/8828 429/482 |
| 2014/0356623 A1* | 12/2014 | Yu | ........................... | B01J 13/02 428/402 |
| 2016/0211530 A1 | 7/2016 | Kongkanand | | |
| 2016/0226077 A1 | 8/2016 | Atienza et al. | | |

FOREIGN PATENT DOCUMENTS

| | | | |
|---|---|---|---|
| CN | 104995774 | A | 10/2015 |
| CN | 105209527 | A | 12/2015 |
| JP | 2006-164574 | A | 6/2006 |
| JP | 2010067509 | A | 3/2010 |
| JP | 2012074331 | A | 4/2012 |
| JP | 5197590 | B2 | 5/2013 |
| JP | 2014-220111 | A | 11/2014 |
| JP | 2015-176695 | A | 10/2015 |
| JP | 2016-091878 | A | 5/2016 |
| JP | 2016-154135 | A | 8/2016 |
| KR | 10-0759435 | B1 | 10/2007 |
| KR | 10-2010-0040103 | A | 4/2010 |
| KR | 10-2012-0046244 | A | 5/2012 |
| KR | 10-2014-0013186 | A | 2/2014 |
| KR | 10-2018-0002089 | A | 1/2018 |
| WO | 2012116782 | A1 | 9/2012 |

OTHER PUBLICATIONS

International Search Report of PCT/KR2018/006888 dated Oct. 19, 2018.
CN office action dated Oct. 20, 2021.

* cited by examiner

【FIG. 1】
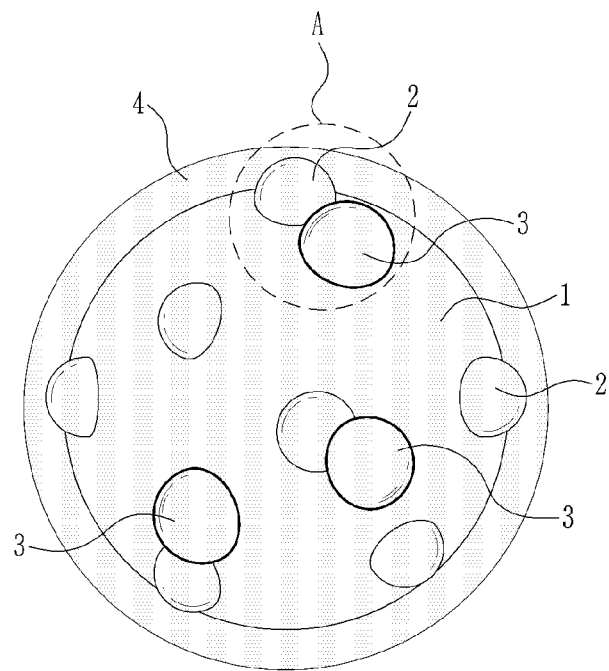
【FIG. 2】
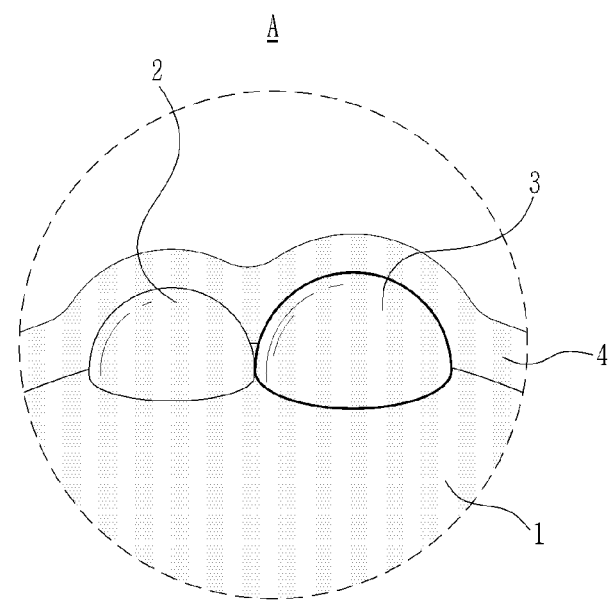

[FIG. 3]
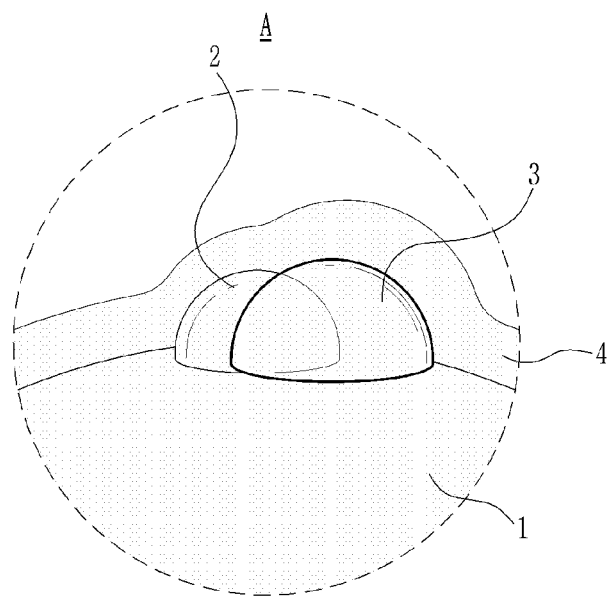
[FIG. 4]
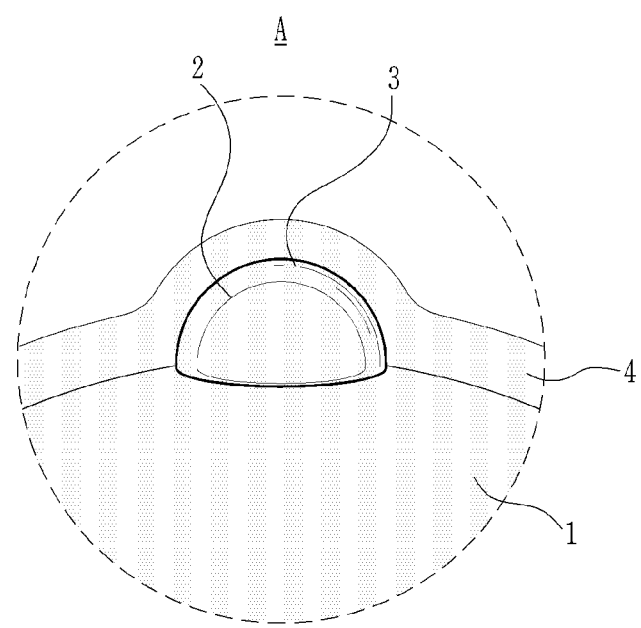

【FIG. 5】
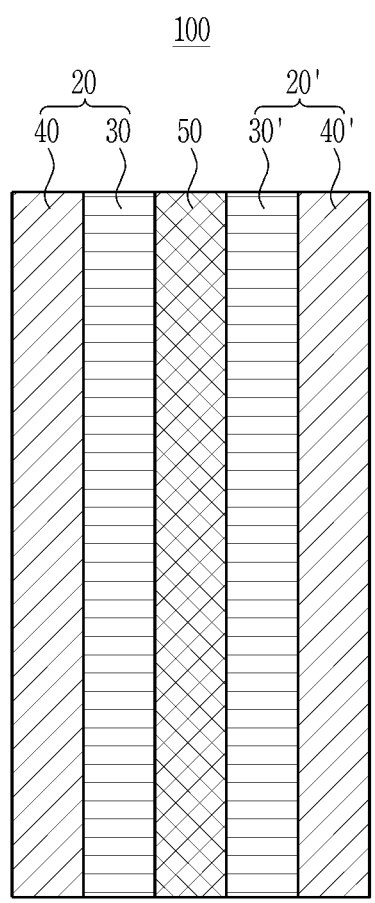

[FIG. 6]
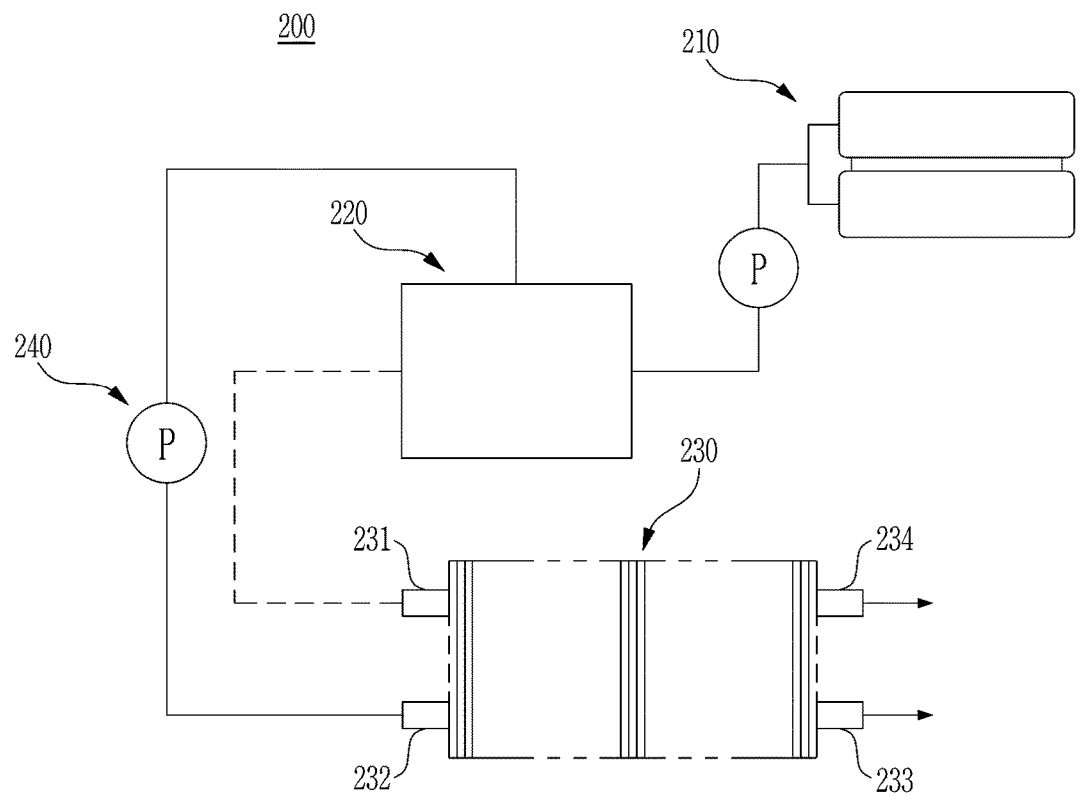

【FIG. 7】
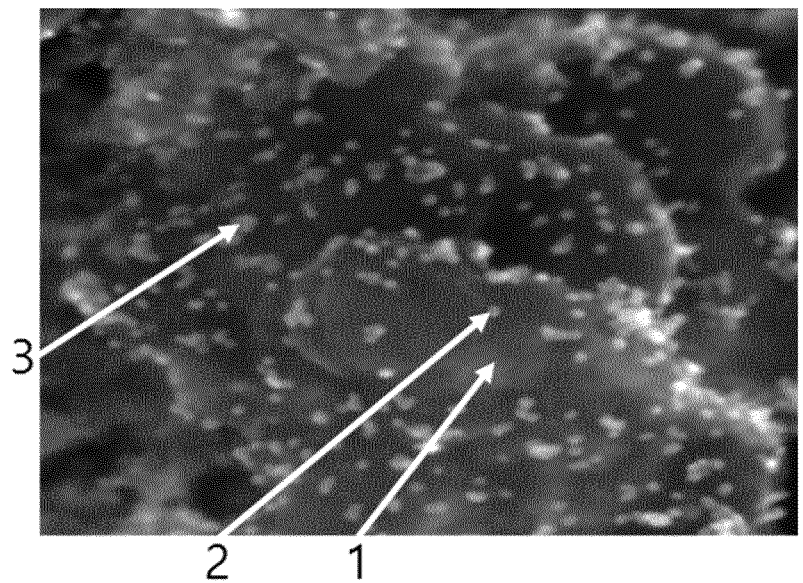
【FIG. 8】
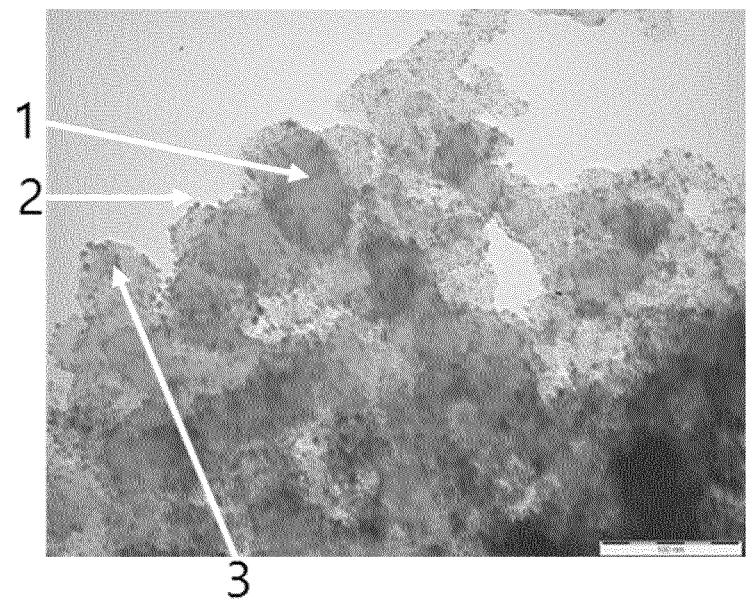

【FIG. 9】
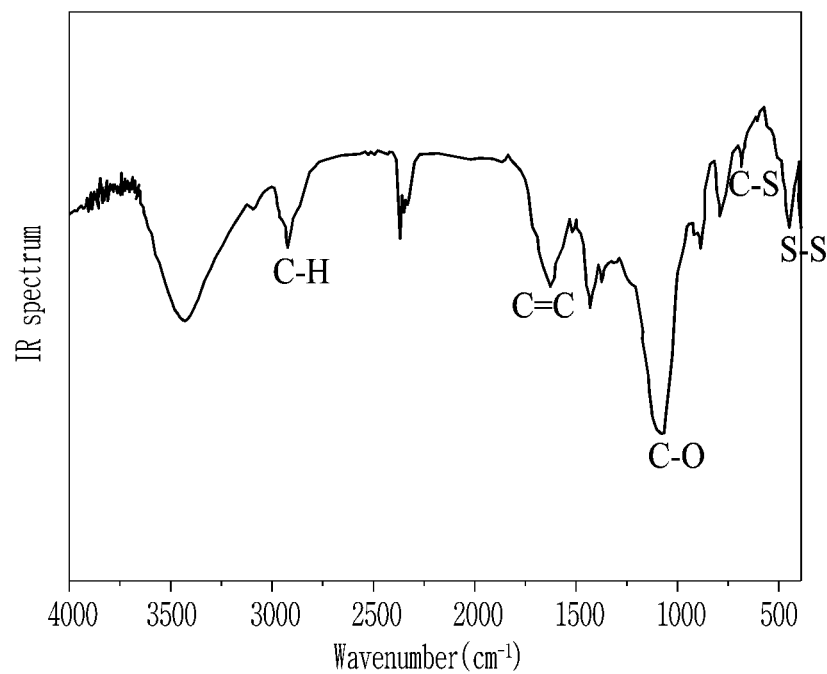
【FIG. 10】
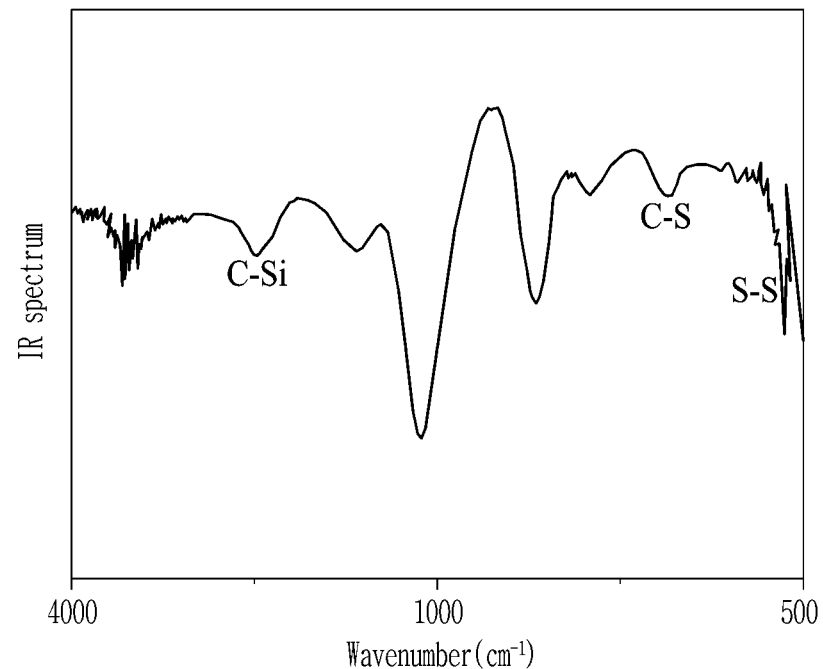

[FIG. 11]
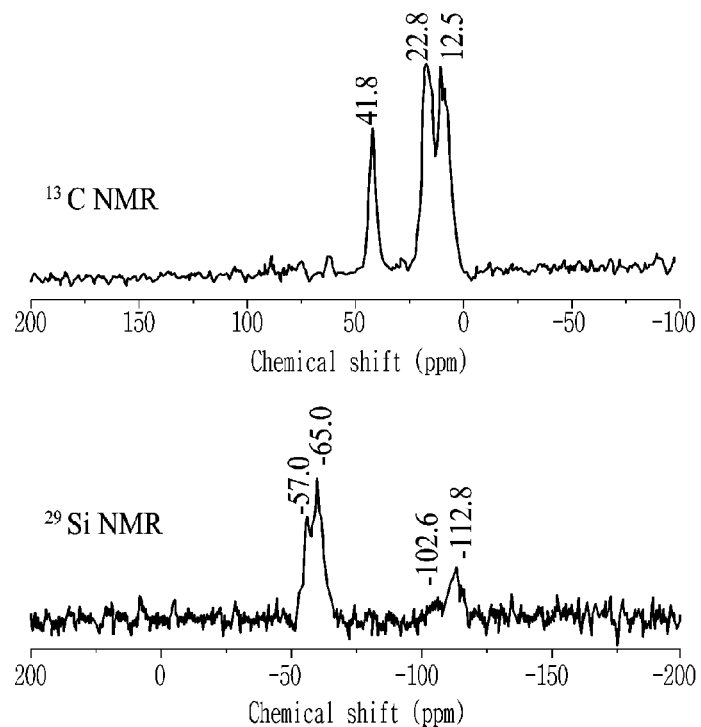
[FIG. 12]
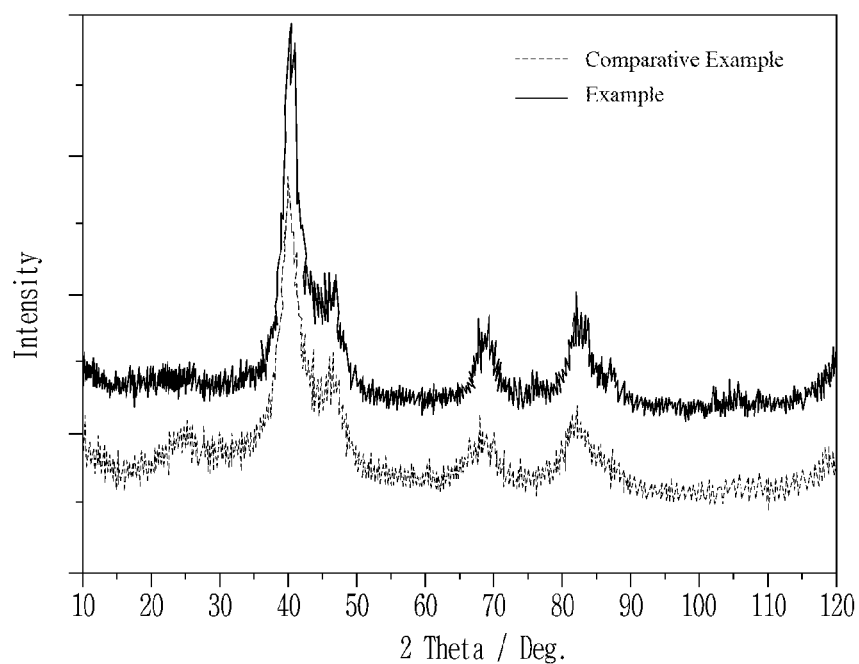

【FIG. 13】
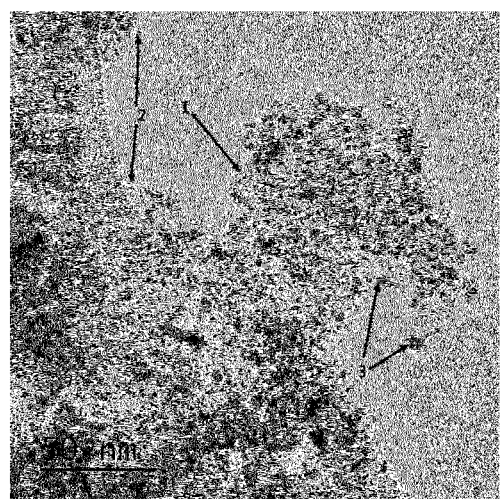
【FIG. 14】
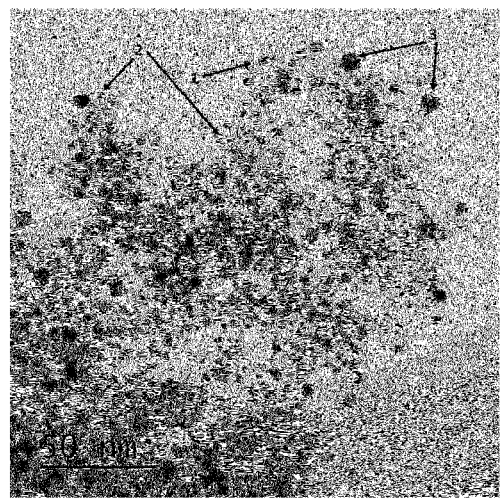

[FIG. 15]
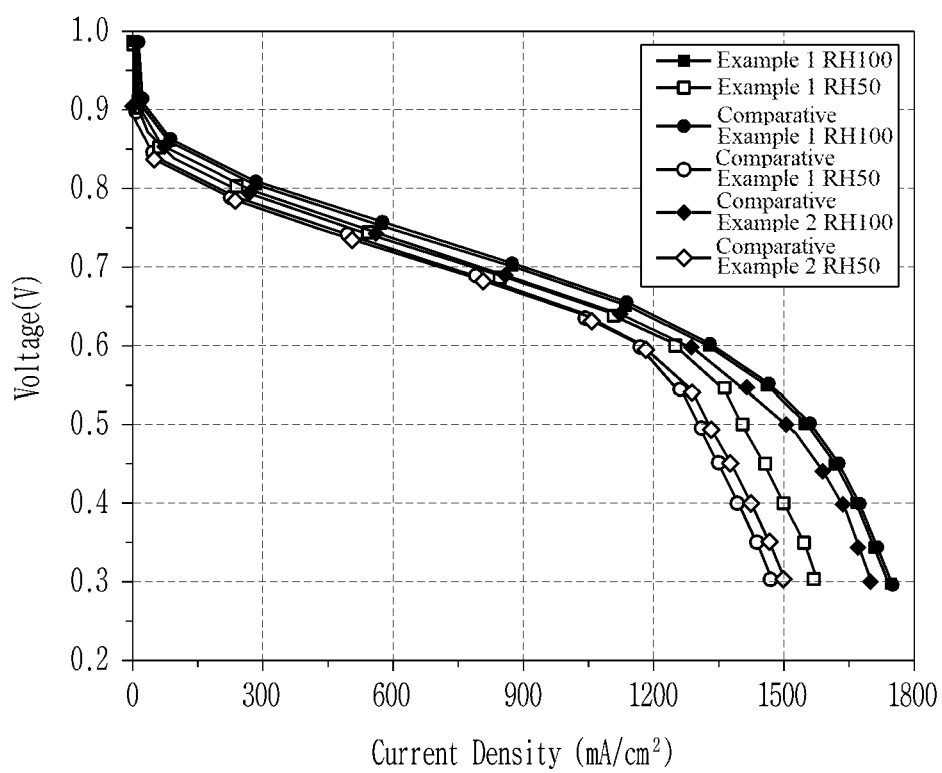

[FIG. 16]
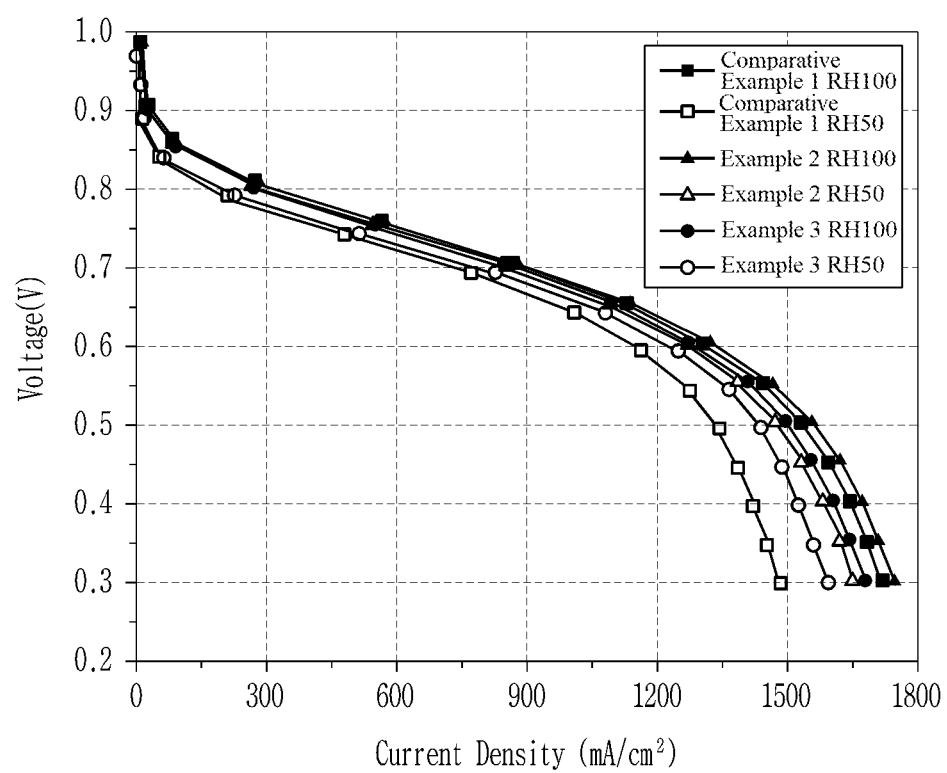

# ELECTRODE COMPRISING ORGANIC FUNCTIONAL METAL OXIDE, MANUFACTURING METHOD THEREFOR, MEMBRANE-ELECTRODE ASSEMBLY COMPRISING SAME, AND FUEL CELL COMPRISING MEMBRANE-ELECTRODE ASSEMBLY

CROSS REFERENCE TO RELATED APPLICATIONS

This application is a National Stage of International Application No. PCT/KR2018/006888 filed Jun. 19, 2018, claiming priority based on Korean Patent Application No. 10-2017-0079426 filed Jun. 23, 2017 and Korean Patent Application No. 10-2018-0069647 filed Jun. 18, 2018.

TECHNICAL FIELD

The present invention relates to an electrode comprising organic functional metal oxides, a manufacturing method thereof, a membrane-electrode assembly including the same, and a fuel cell including the membrane-electrode assembly, and more specifically, to an electrode which improves catalyst performance and durability, which can reduce the amount of a catalyst used and catalyst costs by enabling excellent current density and power density to be obtained even in a state that a relatively small amount of the catalyst is used through an increase in catalyst utilization and uniform dispersion of the catalyst, and which improves performance in general conditions and low humidification performance, a manufacturing method thereof, a membrane-electrode assembly including the same, and a fuel cell including the membrane-electrode assembly.

BACKGROUND ART

Fuel cells, as cells including a power generation system which directly converts energy of a chemical reaction such as an oxidation/reduction reaction of hydrogen and oxygen contained in hydrocarbon-based fuel materials such as methanol, ethanol and a natural gas into electric energy, have been spotlighted as next generation clean energy sources which are capable of replacing fossil energy due to high energy efficiency and environmentally friendly properties with less amounts of pollutants being discharged.

Such fuel cells have an advantage of outputs of various ranges, and exhibit energy density of 4 to 10 times compared to a small lithium battery by stacking unit cells, thereby forming a stack. Therefore, the fuel cells have been receiving attention as small and portable power supplies.

The stack which substantially generates electricity from the fuel cell has a structure in which several to several tens of unit cells including a membrane-electrode assembly (MEA) and a separator (hereinafter also referred to as 'a bipolar plate') are stacked, and the membrane-electrode assembly generally has a structure in which the anode and the cathode are each formed at both sides of the electrolyte membrane in a state that an electrolyte membrane is disposed between an anode (or a fuel electrode) and a cathode (or an air electrode).

The fuel cells may be classified into an alkaline electrolyte fuel cell, a polymer electrolyte membrane fuel cell (PEMFC), and the like according to states and types of electrolytes, and among them, the polymer electrolyte membrane fuel cell has been spotlighted as a power source device for portable, automobile and domestic applications, due to its advantages such as a low operation temperature of less than 100° C., fast starting and response characteristics, and excellent durability.

Representative examples of the polymer electrolyte membrane fuel cell may include a proton exchange membrane fuel cell (PEMFC) which uses hydrogen gas as fuel, a direct methanol fuel cell (DMFC) which uses liquid methanol as the fuel, and the like.

A reaction occurring in the polymer electrolyte membrane fuel cell is summarized. First, when the fuel such as the hydrogen gas is supplied to the anode, hydrogen ions ($H^+$) and electrons ($e^-$) are generated by an oxidation reaction of hydrogen in the anode. The generated hydrogen ions are delivered to the cathode through a polymer electrolyte membrane, and the generated electrons are delivered to the cathode through an external circuit. The cathode supplies oxygen, and oxygen is bonded to hydrogen ions and electrons to generate water by a reduction reaction of oxygen.

Recently, interests in the polymer electrolyte membrane fuel cell which is interlocked with requirements of a fuel cell for transportation and operated under high temperature and low humidity conditions have been increasing due to its possibilities such as solving of a CO poisoning problem, improvement of electrochemical reactivity, simplification of water and thermal management structure, cost reduction of the polymer electrolyte membrane fuel cell, and the like.

However, an ionomer has characteristics that proton conductivity of the ionomer is greatly changed under a low humidity condition. Particularly, the lower equivalent weight (EW) of the ionomer is, the more its phenomenon is deepened. In order to solve such a problem, nano-sized moisture absorbing metal oxide particles may be subsided into a catalyst layer to increase water content within a polymer matrix. Subsidence of the moisture absorbing metal oxide particles is carried out by dispersing generally synthesized moisture absorbing metal oxide particles into an electrode. However, this case has a problem that the moisture absorbing metal oxide particles are lost or aggregated during the operation since the moisture absorbing metal oxide particles are not easily fixed, but are simply mixed within the electrode.

DISCLOSURE

Technical Problem

An objective of the present invention is to provide an electrode which improves catalyst performance and durability, which can reduce the amount of a catalyst used and catalyst costs by enabling excellent current density and power density to be obtained even in a state that a relatively small amount of the catalyst is used through an increase in catalyst utilization and uniform dispersion of the catalyst, and which improves performance in general and low humidification conditions.

Other objective of the present invention is to provide a manufacturing method of the electrode.

Another objective of the present invention is to provide a membrane-electrode assembly including the electrode.

Another objective of the present invention is to provide a fuel cell including the membrane-electrode assembly.

Technical Solution

Provided is an electrode according to an embodiment of the present invention comprising a support, catalyst particles supported on the support, organic functional metal oxide nanoparticles supported on the support, and an ionomer positioned on the surface of the support.

The organic functional metal oxide nanoparticles may be positioned to be adjacent to the catalyst particles.

The organic functional metal oxide nanoparticles may cover an entire surface or a partial surface of the catalyst particles.

The organic functional metal oxide nanoparticles may be oxide particles of any one metal selected from the group consisting of Si, Ru, Ti, Sn, Ni, Co, Zn, Mo, Zr, W, V, Ce, Ir, Ge, Mn, Fe, and Y.

The organic functional metal oxide nanoparticles may have any one element selected from the group consisting of S, N, P, and F included in an organic functional group thereof.

The organic functional metal oxide nanoparticles may be formed by performing a sol-gel reaction of a precursor of organic functional metal oxide nanoparticles represented by the following chemical formula 1 or the following chemical formula 2:

[Chemical formula 1]

[Chemical formula 2]

In chemical formulas 1 and 2, X are each independently an organic functional group including any one element selected from the group consisting of S, N, P and F, M are each independently any one metal selected from the group consisting of Si, Ru, Ti, Sn, Ni, Co, Zn, Mo, Zr, W, V, Ce, Ir, Ge, Mn, Fe, and Y, $R^1$ are each independently any one selected from the group consisting of hydrogen, a $C_1$-$C_6$ linear or branched alkyl group, a $C_1$-$C_6$ alkoxy group, $PO_4^-$, $SO_3^-$, $O^-$, $S^-$ and a halogen group, l are each independently an integer of 1 to 12, and m are each independently an integer of 2 to 7, provided that m=(metallic valence of M)−1.

The organic functional metal oxide nanoparticles may be formed by performing a sol-gel reaction of a precursor of organic functional metal oxide nanoparticles of any one selected from the group consisting of a sulfide functional silane compound, a mercapto functional silane compound, an amino functional silane compound, an N-acetyl functional silane compound, a diethylphosphate functional silane compound, a fluoro functional silane compound, and mixtures thereof.

The organic functional metal oxide nanoparticles may be formed by performing a sol-gel reaction of a precursor of organic functional metal oxide nanoparticles of any one selected from the group consisting of chloromethylmethyldichlorogermanium, ethylchlorogermanium, tetraethoxygermanium, trifluoromethyltriiodogermanium, tetrakis(dimethylamino)germanium, bis(tri-N-butyltin)sulfide, dimethylaminotrimethyltin, zirconiumtetrakistriethanolamine, and mixtures thereof.

The electrode may comprise 1 to 15 wt % of the metal oxide nanoparticles with respect to the total weight of the electrode.

The organic functional metal oxide nanoparticles may have a particle diameter of 1 to 20 nm.

The ionomer may cover any one selected from the group consisting of the catalyst particles, the organic functional metal oxide nanoparticles, and both thereof.

Furthermore, provided is a manufacturing method of an electrode according to another embodiment of the present invention, the manufacturing method comprising the steps of preparing an electrode forming composition comprising a support, catalyst particles, a precursor of organic functional metal oxide nanoparticles, and an ionomer, and coating the electrode forming composition to manufacture the electrode.

The precursor of the organic functional metal oxide nanoparticles may form the organic functional metal oxide nanoparticles by performing the sol-gel reaction.

The precursor of the organic functional metal oxide nanoparticles may be represented by the following chemical formula 1 or the following chemical formula 2:

[Chemical formula 1]

[Chemical formula 2]

In chemical formulas 1 and 2, X are each independently an organic functional group including any one element selected from the group consisting of S, N, P and F, M are each independently any one metal selected from the group consisting of Si, Ru, Ti, Sn, Ni, Co, Zn, Mo, Zr, W, V, Ce, Ir, Ge, Mn, Fe, and Y, $R^1$ are each independently any one selected from the group consisting of hydrogen, a $C_1$-$C_6$ linear or branched alkyl group, a $C_1$-$C_6$ alkoxy group, $PO_4^-$, $SO_3^-$, $O^-$, $S^-$ and a halogen group, l are each independently an integer of 1 to 12, and m are each independently an integer of 2 to 7, provided that m=(metallic valence of M)−1.

The precursor of the organic functional metal oxide nanoparticles may be any one selected from the group consisting of a sulfide functional silane compound, a mercapto functional silane compound, an amino functional silane compound, an N-acetyl functional silane compound, a diethylphosphate functional silane compound, a fluoro functional silane compound, and mixtures thereof.

The precursor of the organic functional metal oxide nanoparticles may be any one selected from the group consisting of chloromethylmethyldichlorogermanium, ethylchlorogermanium, tetraethoxygermanium, trifluoromethyltriiodogermanium, tetrakis(dimethylamino)germanium, bis(tri-N-butyltin)sulfide, dimethylaminotrimethyltin, zirconiumtetrakistriethanolamine, and mixtures thereof.

Furthermore, provided is a membrane-electrode assembly according to another embodiment of the present invention, the membrane-electrode assembly including an anode electrode and a cathode electrode positioned to face each other, and an ion exchange membrane positioned between the anode electrode and the cathode electrode, wherein any one selected from the group consisting of the anode electrode, the cathode electrode and both thereof includes the electrode.

Furthermore, a fuel cell including the membrane-electrode assembly according to another embodiment of the present invention is provided.

Advantageous Effects

The present invention can provide an electrode which improves catalyst performance and durability, which can reduce the amount of a catalyst used and catalyst costs by enabling excellent current density and power density to be obtained even in a state that a relatively small amount of the catalyst is used through an increase in catalyst utilization and uniform dispersion of the catalyst, and which improves performance in general and low humidification conditions.

BRIEF DESCRIPTION OF THE DRAWINGS

FIG. 1 is a mimetic diagram mimetically illustrating a catalyst according to an embodiment of the present invention.

FIG. 2 to FIG. 4 are each an enlarged view showing an enlarged A portion obtained by enlarging an A portion of FIG. 1 according to an exemplary embodiment.

FIG. 5 is a cross-sectional view schematically showing a membrane-electrode assembly according to an embodiment of the present invention.

FIG. 6 is a mimetic diagram illustrating an overall configuration of a fuel cell according to an embodiment of the present invention.

FIG. 7 is a photograph obtained by observing an electrode manufactured in Example 1 of the present invention using a scanning electron microscope (SEM).

FIG. 8 is a photograph obtained by observing the electrode manufactured in Example 1 of the present invention using a transmission electron microscope (TEM).

FIG. 9 and FIG. 10 are graphs showing results obtained by measuring FT-IR spectrums with respect to the electrode manufactured in Example 1 of the present invention by FT-IR (Fourier-transform infrared spectroscopy).

FIG. 11 is a graph showing results obtained by measuring $^{29}$Si-NMR and $^{13}$C-NMR of the solid state with respect to the electrode manufactured in Example 1 of the present invention.

FIG. 12 is a graph showing results obtained by measuring X-ray diffraction (XRD) values with respect to electrodes manufactured in Example 1 and Comparative Example 1 of the present invention.

FIG. 13 is a photograph obtained by observing an electrode manufactured in Example 2 of the present invention using the transmission electron microscope (TEM).

FIG. 14 is a photograph obtained by observing an electrode manufactured in Example 3 of the present invention using the transmission electron microscope (TEM).

FIG. 15 is a graph showing results obtained by evaluating voltage and current density output characteristics of the electrodes at relative humidity conditions of RH 100 and RH 50 with respect to electrodes manufactured in Example 1, Comparative Example 1 and Comparative Example 2 of the present invention.

FIG. 16 is a graph showing results obtained by evaluating voltage and current density output characteristics of the electrodes at relative humidity conditions of RH 100 and RH 50 with respect to electrodes manufactured in Example 2, Example 3 and Comparative Example 1 of the present invention.

BEST MODE FOR CARRYING OUT THE INVENTION

Hereinafter, embodiments of the present invention will be described in detail. However, these embodiments are only exemplary, the present invention is not limited thereto, and the present invention will only be defined by the scope of the appended claims.

An electrode according to an embodiment of the present invention comprises a support, catalyst particles supported on the support, organic functional metal oxide nanoparticles supported on the support, and an ionomer positioned on the surface of the support.

Any catalyst particles which can be used as a catalyst in a hydrogen oxidation reaction or an oxygen reduction reaction may be used as the catalyst particles, and a platinum-based metal is preferably used as the catalyst particles.

The platinum-based metal may include platinum (Pt), palladium (Pd), ruthenium (Ru), iridium (Ir), osmium (Os), a platinum-M alloy (M is one or more selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La) and rhodium (Rh)), and one selected from the group consisting of combinations thereof, and more preferably combinations of two or more metals selected from the platinum-based catalyst metal group. However, the platinum-based metal is not limited thereto, and the platinum-based catalyst metal may be used without limitation if the platinum-based metal is a platinum-based catalyst metal usable in the art.

The support may be selected from a carbon-based support, porous inorganic oxides such as zirconia, alumina, titania, silica, ceria and the like, zeolite, and others. The carbon-based support may be selected from graphite, super P, carbon fiber, carbon sheet, carbon black, Ketjen black, acetylene black, carbon nanotube (CNT), carbon sphere, carbon ribbon, fullerene, activation carbon, and combinations of one or more thereof. However, the carbon-based support is not limited thereto, and the support may be used without limitation if the carbon-based support is a support usable in the art.

The catalyst particles may be positioned on the surface of the support, and penetrated into the support while filling internal pores of the support.

The catalyst particles may be contained in an amount of 20 to 80 wt % with respect to the total catalyst weight obtained by adding up the catalyst particles and the support. Catalytic activities may be lowered when the catalyst particles are contained in an amount of less than 20 wt % while the catalytic activities may be lowered as aggregation of the catalyst particles reduces activation area when the catalyst particles are contained in an amount of more than 80 wt %.

The organic functional metal oxide nanoparticles are supported on the support along with the catalyst particles. Namely, the organic functional metal oxide nanoparticles may also be positioned on the surface of the support, and penetrated into the support while filling the internal pores of the support.

The organic functional metal oxide nanoparticles can improve performance in general conditions and low humidification performance of the electrode, increases catalyst utilization by bonding the organic functional metal oxide nanoparticles to the catalyst and the ionomer to form a nanostructure, thereby uniformly dispersing the catalyst, and can reduce the amount of the catalyst used and catalyst costs by enabling excellent current density and power density to be obtained even in a state that a relatively small amount of the catalyst particles is used.

The organic functional metal oxide nanoparticles may have a particle diameter of 1 to 20 nm, and specifically, the organic functional metal oxide nanoparticles may have a particle diameter of 2 to 10 nm. Effects of improving low humidification properties may not be exhibited when the organic functional metal oxide nanoparticles have a particle diameter less than 1 nm, and performance of the fuel cell may be hindered when the organic functional metal oxide nanoparticles have a particle diameter more than 20 nm.

The organic functional metal oxide nanoparticles positioned on the surface of the support may be positioned to be adjacent to the catalyst particles, and the organic functional metal oxide nanoparticles are partially overlapped with the catalyst particles such that the organic functional metal oxide nanoparticles and the catalyst particles may be brought into contact with each other.

At this time, according to a ratio that the organic functional metal oxide nanoparticles are partially overlapped with the catalyst particles, the organic functional metal oxide nanoparticles may have a form of independent particles, or may cover the entire surface or the partial surface of the catalyst particles.

It becomes advantageous to receive a help of moisture absorbed by the organic functional metal oxide nanoparticles during low humidity when the organic functional metal oxide nanoparticles are positioned to be adjacent to the catalyst particles compared to when the catalyst particles are independently existed.

The organic functional metal oxide nanoparticles are oxide particles of any one metal selected from the group consisting of Si, Ru, Ti, Sn, Ni, Co, Zn, Mo, Zr, W, V, Ce, Ir, Ge, Mn, Fe and Y, and includes an organic functional group comprising any one element selected from the group consisting of S, N, P and F.

Metal oxides of the organic functional metal oxide nanoparticles have an excellent bonding force with the catalyst particles and the support, and the organic functional group has an excellent bonding force with ion exchange groups positioned at side chains of the ionomer. Therefore, the organic functional metal oxide nanoparticles are bonded to the catalyst and the ionomer such that a nanostructure can be formed. In order to strengthen a bonding force with the ionomer, the organic functional group is preferably an organic functional group comprising any one element selected from the group consisting of S, N, P and F having an unshared electron pair.

The organic functional metal oxide nanoparticles may be formed by performing the sol-gel reaction of the precursor of the organic functional metal oxide nanoparticles. A method of forming the organic functional metal oxide nanoparticles by performing the sol-gel reaction of the precursor of the organic functional metal oxide nanoparticles will be described later in the related paragraph of a manufacturing method of the electrode.

However, the organic functional metal oxide nanoparticles may be formed by performing the sol-gel reaction of the precursor of the organic functional metal oxide nanoparticles represented by the following chemical formula 1:

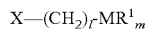 [Chemical formula 1]

In chemical formula 1, X is an organic functional group including any one element selected from the group consisting of S, N, P and F, and is preferably an organic functional group comprising any one element selected from the group consisting of S, N, P and F to strengthen a bonding force with the ionomer. More specifically, the organic functional group may be $-NR'_2$, $-SR'$, $-S-S-R'$, $-SO_3R'$, $-PO_3R'_2$, $-F$, or the like. Here, R' may be each independently any one substituent selected from the group consisting of hydrogen, a $C_1$-$C_6$ linear or branched alkyl group, and a $C_1$-$C_6$ linear or branched alkoxy group.

M may be any one metal selected from the group consisting of Si, Ru, Ti, Sn, Ni, Co, Zn, Mo, Zr, W, V, Ce, Ir, Ge, Mn, Fe, and Y.

$R^1$ are each independently any one selected from the group consisting of hydrogen, a $C_1$-$C_6$ linear or branched alkyl group, a $C_1$-$C_6$ alkoxy group, $PO_4^-$, $SO_3^-$, $O^-$, $S^-$ and a halogen group, and at least any one of $R^1$ may be an oxygen atom-containing alkoxy group, $PO_4^-$, a halogen group, or the like such that the precursor of the organic functional metal oxide nanoparticles represented by chemical formula 1 forms the organic functional metal oxide nanoparticles through the sol-gel reaction. When $R^1$ is an anion such as $PO_4^-$ or the like, $R^1$ may be covalent-bonded with thee metal M.

l is an integer of 1 to 12, and may be preferably an integer of 1 to 4.

m is determined by a bondable metallic valence of the metal M, and m=(metallic valence of M)–1 since M is bonded to $-(CH_2)_l-$. m is determined according to types of the metal M, and may be an integer of 2 to 7.

Although chemical formula 1 exemplifies that the precursor of the organic functional metal oxide nanoparticles is formed in a mono form, the form of the precursor of the organic functional metal oxide nanoparticles is not limited thereto, and the precursor of the organic functional metal oxide nanoparticles may be a bis type compound as represented by the following chemical formula 2:

 [Chemical formula 2]

The definitions of X, M, $R^1$, l and m chemical formula 2 are the same as in chemical formula 1, and X, M, R1, l and m which are each existed in the number of 2 in chemical formula 2 may be different from or the same as each other.

More specifically, the organic functional metal oxide nanoparticles may be formed by performing a sol-gel reaction of a precursor of organic functional metal oxide nanoparticles of any one selected from the group consisting of a sulfide functional silane compound, a mercapto functional silane compound, an amino functional silane compound, an N-acetyl functional silane compound, a diethylphosphate functional silane compound, a fluoro functional silane compound, and mixtures thereof.

The sulfide functional silane compound may be any one selected from the group consisting of bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, 3-trimethoxysilylpropylmethacrylatemonosulfide, 3-trimethoxysilylpropylmethacrylatemonosulfide, and combinations thereof.

The mercapto functional silane compound may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane, and combinations thereof.

The amino functional silane compound may be any one selected from the group consisting of 3-aminopropyltriethoxysilane, 3-aminopropyltrimethoxysilane, 3-(2-aminoethyl)aminopropyltriethoxysilane, 3-(2-aminoethyl)aminopropyltrimethoxysilane, and combinations thereof.

The fluoro functional silane compound may be any one selected from the group consisting of 3-fluoropropyltrimethoxysilane, 3-fluoropropyltriethoxysilane, 2-fluoroethyltrimethoxysilane, 2-fluoroethyltriethoxysilane, heptadecylfluoro-1,1,2,2-tetrahydrodecyltrichlorosilane, and combinations thereof.

The diethylphosphate functional silane compound may be 2-diethylphosphateethyltriethoxysilane.

Further, the organic functional metal oxide nanoparticles may be formed by performing a sol-gel reaction of a precursor of organic functional metal oxide nanoparticles of any one selected from the group consisting of chloromethylmethyldichlorogermanium, ethylchlorogermanium, tetraethoxygermanium, trifluoromethyltriiodogermanium, tetrakis(dimethylamino)germanium, bistri-N-butyltinsulfide, dimethylaminotrimethyltin, zirconiumtetrakistriethanolamine, and mixtures thereof in addition to the above-described silane compounds.

The organic functional metal oxide nanoparticles may be contained in an amount of 1 to 15 wt % with respect to the total weight of the electrode, and specifically, may be contained in an amount of 2 to 8 wt %. Effects of improving low humidification properties may not be exhibited when the organic functional metal oxide nanoparticles are contained in an amount of less than 1 wt %, and performance of the fuel cell may be hindered due to excessive production of organic functional metal oxides when the organic functional metal oxide nanoparticles are contained in an amount of more than 15 wt %.

Meanwhile, the ionomer is positioned on the surface of the support, and specifically, may cover any one selected from the group consisting of the catalyst particles, the organic functional metal oxide nanoparticles, and both thereof. According as the ionomer is positioned on the surface of the support, the organic functional metal oxide nanoparticles are bonded to the catalyst and the ionomer to form a nanostructure.

The ionomer may be a cationic conductor having a cation exchange group such as proton, or an anionic conductor having an anion exchange group such as a hydroxyl ion, carbonate or bicarbonate.

The cation exchange group may be any one selected from the group consisting of a sulfonic acid group, a carboxyl group, a boronic acid group, a phosphoric acid group, an imide group, a sulfonimide group, a sulfonamide group and combinations thereof, and may generally be the sulfonic acid group or the carboxyl group.

The cationic conductor may include: a fluoro-based polymer which includes the cation exchange group and has fluorine included in a main chain thereof; a hydrocarbon-based polymer such as benzimidazole, polyamide, polyamideimide, polyimide, polyacetal, polyethylene, polypropylene, acrylic resin, polyester, polysulfone, polyether, polyether imide, polyethersulfone, polycarbonate, polystyrene, polyphenylene sulfide, polyether ether ketone, polyether ketone, polyarylethersulfone, polyphosphazene, polyphenylquinoxaline, or the like; a partially fluorinated polymer such as a polystyrene-graft-ethylene-tetrafluoroethylene copolymer, a polystyrene-graft-polytetrafluoroethylene copolymer, or the like; sulfonimide; and the like.

More specifically, when the cationic conductor is a hydrogen ion cationic conductor, the polymers may have a cation exchange group selected from the group consisting of a sulfonic acid group, a carboxylic acid group, a phosphoric acid group, a phosphonic acid group, and derivatives thereof included in side chains thereof. Although specific examples of the polymers may include: fluoro-based polymers comprising a tetrafluoroethylene-fluorovinyl ether copolymer including poly(perfluorosulfonic acid), polyperfluorocarboxylic acid and sulfonic acid groups, defluorinated polyetherketone sulfide, or a mixture thereof; and hydrocarbon-based polymers comprising sulfonated polyimide (S—PI), sulfonated polyarylethersulfone (S-PAES), sulfonated polyetheretherketone (SPEEK), sulfonated polybenzimidazole (SPBI), sulfonated polysulfone (S—PSU), sulfonated polystyrene (S—PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures thereof, the polymers are not limited thereto.

Further, the cationic conductor may replace H with Na, K, Li, Cs or tetrabutylammonium at the cation exchange group of side chain terminals. When NaOH is replaced with tetrabutyl ammonium during the preparation of a carbon structure composition if H is replaced with Na at the cation exchange group of the side chain terminals, a replacement process is performed using tetrabutylammonium hydroxide, and K, Li or Cs can also be replaced using appropriate compounds. Since the replacement process is well-known in this related field, detailed descriptions thereof will be omitted in this specification.

The cationic conductor can be used singularly or in a combination, and the cationic conductor may be selectively used along with a non-conductive compound to further improve adhesive strength with an ion exchange membrane. It is preferable to use the usage amount-adjusted cationic conductor by adjusting the usage amount of the cationic conductor to be suitable for the purpose of use.

The non-conductive compound may include one or more selected from the group consisting of polytetrafluoroethylene (PTFE), tetrafluoroethylene-hexafluoropropylene copolymer (FEP), tetrafluoroethylene-perfluoroalkylvinylether copolymer (PFA), ethylene tetrafluoroethylene (ETFE), ethylene-chlorotrifluoroethylene copolymer (ECTFE), polyvinylidene fluoride, poly(vinylidene fluoride-hexafluoropropylene) copolymer (PVdF-HFP), dodecylbenzenesulfonic acid, and sorbitol.

The anionic conductor, as a polymer which can transfer anions such as the hydroxyl ion, carbonate or bicarbonate, is commercially available in the form of a hydroxide or a halide (generally chloride), and the anionic conductor can be used in industrial water purification, metal separation or carbon structure process, and the like.

The anionic conductor may generally include metal hydroxide-doped polymers, and may specifically include metal hydroxide-doped poly(ether sulfone), polystyrene, vinyl based polymer, poly(vinyl chloride), poly(vinylidene fluoride), poly(tetrafluoroethylene), poly(benzimidazole) or poly(ethyelene glycol), and the like.

Further, commercially available examples of the ionomer may include Nafion, Aquivion, and the like.

The ionomer may be contained in an amount of 20 to 45 wt % with respect to the total weight of the electrode, and may specifically be contained in an amount of 25 to 38 wt %. Performance of the fuel cell may be lowered when the ionomer is contained in an amount of less than 20 wt %, and an agglomerated portion may be generated between the ionomers due to an excessive amount of the ionomer when the ionomer is contained in an amount of more than 45 wt %.

Meanwhile, amounts of the catalyst particles and the support contained in the electrode may be the remaining weight which is obtained by excluding weights of the ionomer and the organic functional metal oxide nanoparticles from the total electrode weight.

FIG. 1 is a mimetic diagram mimetically illustrating the catalyst, and FIG. 2 to FIG. 4 are each an enlarged view showing an enlarged A portion obtained by enlarging an A portion of FIG. 1 according to an exemplary embodiment.

Referring to FIG. 1, the catalyst particles 2 and the organic functional metal oxide nanoparticles 3 are supported on the support, and the ionomer 4 covers the catalyst particles 2 and the organic functional metal oxide nanoparticles 3 in a state that the ionomer 4 is positioned on the surface of the support 1.

FIG. 2 illustrates that the catalyst particles 2 and the organic functional metal oxide nanoparticles 3 are positioned to be adjacent to each other in a state that the catalyst particles 2 and the organic functional metal oxide nanoparticles 3 are brought into contact with the surface of the support 1 in FIG. 1, FIG. 3 illustrates that the organic functional metal oxide nanoparticles 3 cover a partial surface of the catalyst particles 2 according as the organic functional metal oxide nanoparticles 3 are partially overlapped with the catalyst particles 2, and FIG. 4 illustrates that the organic functional metal oxide nanoparticles 3 cover an entire surface of the catalyst particles 2.

A manufacturing method of an electrode according to another embodiment of the present invention comprises the steps of preparing an electrode forming composition comprising the support, the catalyst particles, the precursor of the organic functional metal oxide nanoparticles, and the ionomer, and coating the electrode forming composition to manufacture the electrode.

Since respective descriptions for the support, the catalyst particles, the precursor of the organic functional metal oxide nanoparticles, and the ionomer are the same as described above, repetitive descriptions thereof are omitted. Hereinafter, a method of manufacturing the electrode using the support, the catalyst particles, the precursor of the organic functional metal oxide nanoparticles, and the ionomer will be mainly described.

First, the electrode forming composition comprising the support, the catalyst particles, the precursor of the organic functional metal oxide nanoparticles, and the ionomer is prepared.

After adding the support, the catalyst particles, the precursor of the organic functional metal oxide nanoparticles and the ionomer to a solvent, the electrode forming composition can be prepared through any one dispersion method selected from ultrasonic dispersion, stirring, 3-roll mill, planetary agitation, high pressure dispersion, and mixed methods thereof.

At this time, the order of mixing the support, the catalyst particles, the precursor of the organic functional metal oxide nanoparticles and the ionomer is not limited in the present invention, and the step of preparing the electrode forming composition may comprise a process of mixing the ionomer and the precursor of the organic functional metal oxide nanoparticles with the catalyst solution to obtain a mixture after first preparing a catalyst solution including the catalyst, a process of mixing a solution including the ionomer with the catalyst solution and the precursor of the organic functional metal oxide nanoparticles to obtain a mixture, or a process of mixing a solution including the precursor of the organic functional metal oxide nanoparticles with the catalyst solution and the ionomer to obtain a mixture.

On the other hand, the support and the catalyst particles may be mixed with each other to obtain a mixture, or the support on which the catalyst particles are supported may be mixed to obtain a mixture. A catalyst in which the catalyst particles are supported on the support may include a commercially available product on the market or a product produced by supporting the catalyst particles on the support. Since the process of supporting the catalyst particles on the support is well-known in this related field, the process will be readily understood by those skilled in the art although detailed descriptions thereof will be omitted in this specification.

Further, after dispersing the catalyst in a wetting solution, the catalyst dispersed in the wetting solution may be added to the mixture, or the catalyst dispersed in the wetting solution in a solid state may be added to the mixture.

The solvent may be a solvent selected from the group consisting of water, a hydrophilic solvent, an organic solvent, and mixtures of one or more thereof.

Examples of the hydrophilic solvent may be solvents having one or more functional groups selected from the group consisting of alcohol, ketone, aldehyde, carbonate, carboxylate, carboxylic acid, ether and amide having a $C_1$-$C_{12}$ linear or branched saturated or unsaturated hydrocarbon included as a main chain thereof, and the solvents may have an alicyclic or aromatic cyclo compound included as at least a portion of the main chain thereof. Specific examples of the hydrophilic solvent may include: alcohol such as methanol, ethanol, isopropyl alcohol, ethoxy ethanol, n-propyl alcohol, butyl alcohol, 1,2-propandiol, 1-pantanol, 1,5-pentanediol, 1,9-nonanediol, or the like; ketone such as heptanone, octanone, or the like; aldehyde such as benzaldehyde, tolualdehyde, or the like; ester such as methyl pentanoate, ethyl 2-hydroxypropanoate, or the like; carboxylic acid such as pentanoic acid, heptanoic acid, or the like; ether such as methoxybenzene, dimethoxypropane, or the like; and amide such as propaneamide, butylamide, dimethyl acetamide, or the like.

The organic solvent may be selected from N-methylpyrrolidone, dimethyl sulfoxide, tetrahydrofuran, and mixtures thereof.

The solvent may be contained in an amount of 80 to 95 wt % with respect to the total weight of the electrode forming composition. There may be a cracking problem generated during coating of the electrode or a dispersion problem due to high viscosity since a solid content of the solvent is too high when the solvent is contained in an amount of less than 80 wt % with respect to the total weight of the electrode forming composition. The solvent may be unfavorable in activation of the electrode when the solvent is contained in an amount of more than 95 wt % with respect to the total weight of the electrode forming composition.

On the other hand, the precursor of the organic functional metal oxide nanoparticles forms the organic functional metal oxide nanoparticles by performing the sol-gel reaction. The organic functional metal oxide nanoparticles themselves are not added to the electrode forming composition, the precursor of the organic functional metal oxide nanoparticles is added to the electrode forming composition, and the organic functional metal oxide nanoparticles are formed by the sol-gel reaction of the precursor of the organic functional metal oxide nanoparticles in the electrode forming process. Therefore, the organic functional metal oxide nanoparticles may be positioned to be adjacent to the catalyst particles while the organic functional metal oxide nanoparticles are being supported on the support.

Specifically, the organic functional metal oxide nanoparticles are formed by the sol-gel reaction in which a polycondensation process is performed on the hydrolyzed precursor of the organic functional metal oxide nanoparticles in the step of manufacturing the electrode after hydrolyzing the precursor of the organic functional metal oxide nanoparticles in the step of preparing the electrode forming composition.

The ionomer included in the electrode forming composition has the ion exchange group such as a sulfonic acid group or the like included in a side chain thereof. Since the ion exchange group has a too high acidity, the ion exchange group can effectively catalyze a hydrolysis reaction of the precursor of the organic functional metal oxide nanoparticles.

The hydrolyzed precursor of the organic functional metal oxide nanoparticles migrates to negatively charged sulfonate groups ($-SO_3-$) due to a rapid increase in the zeta potential ($\zeta$) at a pH value of less than 2, thereby forming the organic functional metal oxide nanoparticles. At this time, growth of the organic functional metal oxide nanoparticles is inhibited due to strong stabilization and steric hindrance effects of a self-assembled ionomer in the electrode forming composition. Accordingly, nano-sized organic functional metal oxide nanoparticles may have a uniform distribution in the electrode.

Thereafter, the electrode forming composition is dried in the step of manufacturing the electrode, thereby removing a residual solvent, and accelerating condensation of the precursor of the organic functional metal oxide nanoparticles.

In order to stably produce the organic functional metal oxide nanoparticles through the sol-gel reaction of the precursor of the organic functional metal oxide nanoparticles, alcohol and a water-based solvent may be used as the solvent, and some solvents may be added according to reactivity of the precursor of the organic functional metal oxide nanoparticles.

Next, the electrode forming composition is coated to manufacture the electrode.

As a specific example, the step of manufacturing the electrode may further comprise the step of coating the electrode forming composition on a release film to manufacture the electrode, and transferring the electrode onto the ion exchange membrane.

When the electrode forming composition is coated on the release film, it is preferable to uniformly coat the electrode forming composition to a dry thickness of 10 to 200 µm on the release film after continuously or intermittently transferring an electrode forming composition having the active material dispersed therein to a coater.

More specifically, after continuously transferring the electrode forming composition to a coater such as a die coater, a gravure coater, a bar coater, a comma coater, or the like according to viscosity of the electrode forming composition through a pump, the electrode forming composition is uniformly coated to form an electrode layer with a dry thickness of 10 to 200 µm, more preferably 10 to 100 µm, on a decal film by a method of slot die coating, bar coating, comma coating, screen printing, spray coating, doctor blade coating, bush, or the like, and the electrode forming composition coated on the decal film passes through a drying furnace which is maintained to a predetermined temperature to volatilize the solvent.

Activities may be lowered since the catalyst has a low content when the electrode forming composition is coated to a thickness of less than 10 µm, and resistance may be increased since moving distances of ions and electrons are increased when the electrode forming composition is coated to a thickness of more than 200 µm.

The drying process may be performed at a drying temperature of 25 to 90° C. for a drying time of 12 hours or more. A problem that a sufficiently dried electrode cannot be formed may be generated when the drying temperature is less than 25° C., and when the drying time is less than 12 hours. Cracking or the like of the electrode may be generated when the drying process is performed at a temperature of more than 90° C.

However, methods of coating and drying the electrode forming composition are not limited to the above-described methods.

Optionally, the manufacturing method of the electrode may further comprise a step of cutting the dried electrode and release film to a required size to bond the cut electrode to the ion exchange membrane after performing the step of drying the electrode forming composition to obtain a dried electrode.

The ion exchange membrane includes an ionic conductor. The ionic conductor may be a cationic conductor having a cation exchange group such as proton, or an anionic conductor having an anion exchange group such as a hydroxy ion, carbonate or bicarbonate.

The cation exchange group may be any one selected from the group consisting of a sulfonic acid group, a carboxyl group, a boronic acid group, a phosphoric acid group, an imide group, a sulfonimide group, a sulfonamide group and combinations thereof, and may generally be the sulfonic acid group or the carboxyl group.

The cationic conductor may include: a fluoro-based polymer which includes the cation exchange group and has fluorine included in a main chain thereof; a hydrocarbon-based polymer such as benzimidazole, polyamide, polyamideimide, polyimide, polyacetal, polyethylene, polypropylene, acrylic resin, polyester, polysulfone, polyether, polyether imide, polyethersulfone, polycarbonate, polystyrene, polyphenylene sulfide, polyether ether ketone, polyether ketone, polyarylethersulfone, polyphosphazene, polyphenylquinoxaline, or the like; a partially fluorinated polymer such as a polystyrene-graft-ethylene-tetrafluoroethylene copolymer, a polystyrene-graft-polytetrafluoroethylene copolymer, or the like; sulfonimide; and the like.

More specifically, when the cationic conductor is a hydrogen ion cationic conductor, the polymers may have a cation exchange group selected from the group consisting of a sulfonic acid group, a carboxylic acid group, a phosphoric acid group, a phosphonic acid group, and derivatives thereof included in a side chain thereof. Although specific examples of the polymers may include: fluoro-based polymers comprising a tetrafluoroethylene-fluorovinyl ether copolymer including poly(perfluorosulfonic acid), polyperfluorocarboxylic acid and sulfonic acid groups, defluorinated polyetherketone sulfide, or a mixture thereof; and hydrocarbon-based polymers comprising sulfonated polyimide (S—PI), sulfonated polyarylethersulfone (S-PAES), sulfonated polyetheretherketone (SPEEK), sulfonated polybenzimidazole (SPBI), sulfonated polysulfone (S—PSU), sulfonated polystyrene (S—PS), sulfonated polyphosphazene, and mixtures thereof, the polymers are not limited thereto.

Meanwhile, the hydrocarbon-based polymer which not only has an excellent ion conduction function, but also is favorable in terms of a cost may be preferably used among the cationic conductors. Further, when the hydrocarbon-based polymer is used as the ionic conductor, and the hydrocarbon-based polymer is used as a porous support, the hydrocarbon-based polymer included in the hydrocarbon-based ionic conductor and the hydrocarbon-based polymer included in the porous support may be formed of material systems that are identical to each other. Specifically, when sulfonated polyimide (SPI) is used as the hydrocarbon-based ionic conductor, and polyimide is used as the porous support, adhesive properties between the hydrocarbon-based ionic conductor and the porous support can be further improved, and interfacial resistance there between can be further lowered.

The anionic conductor, as a polymer which can transfer anions such as the hydroxyl ion, carbonate or bicarbonate, is commercially available in the form of a hydroxide or a halide (generally chloride), and the anionic conductor can be used in industrial water purification, metal separation or catalytic process, and the like.

The anionic conductor may generally include metal hydroxide-doped polymers, and may specifically include metal hydroxide-doped poly(ether sulfone), polystyrene, vinyl based polymer, poly(vinyl chloride), poly(vinylidene fluoride), poly(tetrafluoroethylene), poly(benzimidazole) or poly(ethylene glycol), and the like.

On the other hand, the ion exchange membrane may be formed in the form of a reinforced membrane in which the ionic conductor is filled in pores of a fluorine-based porous support such as e-PTFE, a porous nanoweb support manufactured by electrospinning, or the like.

The method of bonding the electrode to the ion exchange membrane may include using a transfer method as an example, and the transfer method may be performed by a hot pressing process of applying heat and pressure to a metal press alone or the metal press over which a soft board of rubber material such as silicone rubber material or the like is put.

The transfer method may be performed under conditions of 80 to 150° C. and 50 to 200 kgf/cm². Transferring of the electrode onto the release film may not be properly achieved when the hot pressing process is performed under conditions of less than 80° C. and less than 50 kgf/cm², there is a concern that structural change of the electrode may occur as polymer of the ion exchange membrane is burnt when the hot pressing process is performed at a condition of more than 150° C., and transferring may not be properly achieved as an effect of pressing the electrode is more increased than that of transferring the electrode when the hot pressing process is performed at a condition of more than 200 kgf/cm².

A membrane-electrode assembly according to an another embodiment of the present invention comprises an anode electrode and a cathode electrode which are positioned to face each other, and the ion exchange membrane which is positioned between the anode electrode and the cathode electrode. Any one selected from the group consisting of the anode electrode, the cathode electrode and both thereof may include the electrode according to an embodiment of the present invention. Repeated descriptions of the electrode and the manufacturing method of the electrode will be omitted since the descriptions about the electrode and the manufacturing method of the electrode are the same as described above.

FIG. 5 is a cross-sectional view schematically showing the membrane-electrode assembly. Referring to FIG. 5, the membrane-electrode assembly 100 comprises the ion exchange membrane 50, and the electrodes 20 and 20' which are each disposed on both surfaces of the ion exchange membrane 50. The electrodes 20 and 20' include electrode substrates 40 and 40', and catalyst layers 30 and 30' which are formed on the surface of the electrode substrates 40 and 40', and the membrane-electrode assembly may further comprise a microporous layer (not shown) which includes conductive fine particles of carbon powder, carbon black or the like for facilitating material diffusion in the electrode substrates 40 and 40' between the electrode substrates 40 and 40' and the catalyst layers 30 and 30'.

In the membrane-electrode assembly 100, an electrode 20 which is disposed on one surface of the ion exchange membrane 50, and causes an oxidation reaction generating hydrogen ions and electrons from a fuel that is transferred to the catalyst layer 30 after going by the electrode substrate 40 is referred to as an anode electrode, and an electrode 20' which is disposed on the other surface of the ion exchange membrane 50, and causes a reduction reaction generating water from an oxidizer that is transferred to the catalyst layer 30 after going by the hydrogen ions and the electrode substrate 40' received through the ion exchange membrane 50 is referred to as a cathode electrode.

The catalyst layers 30 and 30' of the anode and cathode electrodes 20 and 20' include an electrode according to an embodiment of the present invention comprising the catalyst, the ionomer, and polyacrylic acid.

The electrode substrates 40 and 40' may include porous conductive substrates such that hydrogen or oxygen can be smoothly supplied. Although typical examples of the electrode substrates 40 and 40' may include carbon paper, carbon cloth, carbon felt and metal cloth (a porous film composed of a metal cloth in the fiber state, or a metal film formed on the surface of a cloth composed of polymer fibers), the typical examples of the electrode substrates 40 and 40' are not limited thereto. Further, it is preferable that the electrode substrates 40 and 40' include electrode substrates which are water repellent-treated with a fluorine-based resin since the water repellent-treated electrode substrates can prevent deterioration of reactant diffusion efficiency due to water generated when a fuel cell is driven. The fluorine-based resin may include polytetrafluoroethylene, polyvinylidene fluoride, polyhexafluoropropylene, polyperfluoroalkylvinylether, polyperfluorosulfonylfluoride alkoxy vinyl ether, fluorinated ethylene propylene, polychlorotrifluoroethylene, or copolymers thereof.

The membrane-electrode assembly 100 may be manufactured by an ordinary manufacturing method of the membrane-electrode assembly except that the electrode according to the present invention is used as the anode electrode 20 or cathode electrode 20'.

A fuel cell according to another embodiment of the present invention includes the membrane-electrode assembly.

FIG. 6 is a mimetic diagram illustrating an overall configuration of the fuel cell.

Referring to FIG. 6, the fuel cell 200 includes a fuel supply unit 210 which supplies a mixed fuel having a fuel and water mixed therein, a reforming unit 220 which reforms the mixed fuel to generate a hydrogen gas-containing reformed gas, a stack 230 which generates electric energy by making the hydrogen gas-containing reformed gas supplied from the reforming unit 220 perform an electrochemical reaction with an oxidizer, and an oxidizer supply unit 240 which supplies the oxidizer to the reforming unit 220 and the stack 230.

The stack 230 includes a plurality of unit cells which generate electric energy by inducing an oxidation/reduction reaction of the hydrogen gas-containing reformed gas supplied from the reforming unit 220 and the oxidizer supplied from the oxidizer supply unit 240.

Each of the unit cells means an electricity-generating unit cell, and includes the membrane-electrode assembly which oxidizes or reduces the hydrogen gas-containing reformed gas and oxygen in the oxidizer, and separators (or called as a bipolar plate, and hereinafter, referred to as "separators") for supplying the hydrogen gas-containing reformed gas and the oxidizer to the membrane-electrode assembly. The separators are disposed at both sides of the membrane-electrode assembly positioned at the center. In this case, separators which are each positioned at an outermost side of the stack may particularly be referred to as end plates.

One end plate out of the separators includes a first supply pipe 231 having a pipe shape for injecting the hydrogen gas-containing reformed gas supplied from the reforming unit 220 and a second supply pipe 232 having a pipe shape for injecting an oxygen gas, and the other end plate out of the separators includes a first discharge pipe 233 for discharging a hydrogen gas-containing reformed gas that has been unreacted and finally remained in the plurality of unit cells to the outside and a second discharge pipe 234 for discharging an oxidizer that has been unreacted and finally remained in the unit cells to the outside.

The electrode can be applied to various fields such as secondary batteries, capacitors, and the like in addition to the membrane-electrode assembly for the fuel cell described above.

MODE(S) FOR CARRYING OUT THE INVENTION

Hereinafter, the embodiments are illustrated in more detail with reference to examples. Preferred embodiments of the present invention will be described below in more detail. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Manufacturing Examples: Manufacturing of Electrodes

Example 1

After putting 400 weight parts of water, and 95 weight parts of a Pt/C catalyst (a product produced by TANAKA) and an ionomer powder (Nafion powder, a product of Dupont Corporation) into a vial, a solution was prepared by wetting the catalyst and the ionomer powder with water through a stirring process, thereby removing bubbles in the catalyst.

After adding 400 weight parts of N-propanol and 5 weight parts of bis(3-triethoxysilylpropyl)disulfide as a precursor of organic functional metal oxide nanoparticles to the solution, a catalyst slurry composition was prepared by uniformly mixing N-propanol and bis(3-triethoxysilylpropyl)disulfide with the solution using stirring and ultrasonic dispersion methods.

After bar-coating the catalyst slurry composition on a polyimide release film under conditions including 10 mm/s of coating speed and 100 μm of coating thickness, the catalyst slurry composition bar-coated on the polyimide release film was dried at 30° C. for 6 hours to manufacture an electrode.

A membrane-electrode assembly was manufactured by hot-pressing and transferring the electrode onto the ion exchange membrane and then peeling off the release film from the electrode transferred onto the ion exchange membrane in such a manner of maintaining the electrode pressed onto the ion exchange membrane at room temperature for 1 minute after cutting the dried electrode to a required size, aligning the electrode and the ion exchange membrane such that the electrode comes in contact with both surfaces of an ion exchange membrane (a product produced by Dupont Corporation; Nafion 212 Membrane), and pressing the electrode onto the ion exchange membrane under heat and pressure conditions of 100° C. and 100 kgf/cm$^2$ for 5 minutes.

A fuel cell including a stack including one or more membrane-electrode assemblies was manufactured.

Example 2

A membrane-electrode assembly was manufactured by performing the same manufacturing process as in Example 1 except that 5 weight parts of 3-aminopropyltriethoxysilane as the precursor of the organic functional metal oxide nanoparticles was added in Example 1.

Example 3

A membrane-electrode assembly was manufactured by performing the same manufacturing process as in Example 1 except that 5 weight parts of tetraethoxygermanium as the precursor of the organic functional metal oxide nanoparticles was added in Example 1.

Comparative Example 1

After putting 400 weight parts of water, and 100 weight parts of a Pt/C catalyst (a product produced by TANAKA) and an ionomer powder (Nafion powder, a product of Dupont Corporation) into a vial, a solution was prepared by wetting the catalyst and the ionomer powder with water through a stirring process, thereby removing bubbles in the catalyst.

After adding 400 weight parts of N-propanol to the solution, a catalyst slurry composition was prepared by uniformly mixing N-propanol with the solution using stirring and ultrasonic dispersion methods.

After bar-coating the catalyst slurry composition on a polyimide release film under conditions including 10 mm/s of coating speed and 100 μm of coating thickness, the catalyst slurry composition bar-coated on the polyimide release film was dried at 30° C. for 6 hours to manufacture an electrode.

A membrane-electrode assembly was manufactured by hot-pressing and transferring the electrode onto the ion exchange membrane and then peeling off the release film from the electrode transferred onto the ion exchange membrane in such a manner of maintaining the electrode pressed onto the ion exchange membrane at room temperature for 1 minute after cutting the dried electrode to a required size, aligning the electrode and the ion exchange membrane such that the electrode comes in contact with both surfaces of an ion exchange membrane (a product produced by Dupont Corporation; Nafion 212 Membrane), and pressing the electrode onto the ion exchange membrane under heat and pressure conditions of 100° C. and 100 kgf/cm$^2$ for 5 minutes.

A fuel cell including a stack including one or more membrane-electrode assemblies was manufactured.

Comparative Example 2

A fuel cell was manufactured by performing the same manufacturing process as in Example 1 except that 5 weight parts of tetraethoxysilane as the precursor of the organic functional metal oxide nanoparticles was added in Example 1.

Experimental Example 1: Observation of Manufactured Electrodes

The electrode manufactured in Example 1 was observed by a scanning electron microscope (SEM) and a transmission electron microscope (TEM), and observation results of the electrode are shown in FIG. 7 and FIG. 8.

Referring to FIG. 7 and FIG. 8, it can be observed that the catalyst particles 2 and the organic functional metal oxide nanoparticles 3 are positioned to be adjacent to each other in a state that the catalyst particles 2 and the organic functional metal oxide nanoparticles 3 are brought into contact with the surface of the support 1.

Further, FT-IR spectrums were measured with respect to the electrode manufactured in Example 1 by FT-IR (Fourier-transform infrared spectroscopy), and measurement results are shown in FIG. 9 and FIG. 10.

Referring to FIG. 9 and FIG. 10, it can be confirmed that C—S spectrums are observed by a sulfur (S)-containing organic functional group of the organic functional metal oxide nanoparticles, and C—Si spectrums are observed by metal oxides of the organic functional metal oxide nanoparticles.

Further, $^{29}$Si-NMR and $^{13}$C-NMR of the solid state were measured with respect to the electrode manufactured in Example 1, and measurement results are shown in FIG. 11.

Referring to FIG. 11, it can be confirmed that sulfur (S)-containing organic functional metal oxide nanoparticles are formed on the surface of a Pt/C catalyst.

Further, X-ray diffraction (XRD) values were measured with respect to the electrodes manufactured in Example 1 and Comparative Example 1, and measurement results are shown in FIG. 12. For reference, Example in FIG. 12 indicates Example 1, and Comparative Example in FIG. 12 indicates Comparative Example 1.

Referring to FIG. 12, although there is not a big difference between the measured XRD value of Example 1 and that of Comparative Example 1. Example 1 shows a result that the measured XRD value of Example 1 is slightly shifted to a high angle by an effect of the sulfur (S)-containing organic functional metal oxide nanoparticles.

Further, the electrodes manufactured in Examples 2 and 3 were observed by the transmission electron microscope (TEM), and observation results are respectively shown in FIG. 13 and FIG. 14. Referring to FIG. 13 and FIG. 14, it can be observed similarly as in the case of Example 1 that the catalyst particles 2 and the organic functional metal oxide nanoparticles 3 are positioned to be adjacent to each other in a state that the catalyst particles 2 and the organic functional metal oxide nanoparticles 3 are brought into contact with the surface of the support 1.

Experimental Example 2: Performance Evaluation of Manufactured Electrodes

Voltage and current density output characteristics of the electrodes were evaluated respectively under relative humidity conditions of RH 100 and RH 50 with respect to the electrodes manufactured in Example 1 and Comparative Examples 1 and 2, and performance evaluation results are shown in FIG. 15.

Referring to FIG. 15, since, as a result of performance evaluation, the electrode manufactured in Example 1 shows more improved performance value than those of the electrodes manufactured in Comparative Examples 1 and 2 under the relative humidity condition of RH 50, it can be confirmed that the electrode manufactured in Example 1 has excellent low humidification properties.

Further, voltage and current density output characteristics of the electrodes were evaluated respectively under relative humidity conditions of RH 100 and RH 50 with respect to the electrodes manufactured in Example 2, Example 3, and Comparative Example 1, and performance evaluation results are shown in FIG. 16.

Referring to FIG. 16, since, as results of performance evaluation, both of the electrodes manufactured in Example 2 and Example 3 show more improved performance values than that of the electrode manufactured in Comparative Example 1 under the relative humidity condition of RH 50 similarly as in the case of Example 1, it can be confirmed that the electrodes manufactured in Example 2 and Example 3 have excellent low humidification properties.

Although the present invention has been described along with the accompanying drawings, this is only one of various examples including the gist of the present invention and has an object of enabling a person having ordinary skill in the art to easily practice the invention. Accordingly, it is evident that the present invention is not limited to the aforementioned examples. Accordingly, the range of protection of the present invention should be interpreted based on the following claims, and all of technological spirits within the equivalents of the present invention may fall within the range of right of the present invention by changes, substitutions and replacements without departing from the gist of the present invention. Furthermore, it is evident that the configurations of some drawings have been provided to more clearly describe configurations and have been more exaggerated or reduced than actual configurations.

DESCRIPTION OF MARKS

1: Support
2: Catalyst particles
3: Organic functional metal oxide nanoparticles
4: Ionomer
40: Electrode substrate
20, 20': Electrodes
30, 30': Catalyst layers
40, 40': Electrode substrates
50: Ion exchange membrane
100: Membrane-electrode assembly
200: Fuel cell
210: Fuel supply unit
220: Reforming unit
230: Stack
231: First supply pipe
232: Second supply pipe
233: First discharge pipe
234: Second discharge pipe
240: Oxidizer supply unit

INDUSTRIAL APPLICABILITY

The present invention relates to an electrode comprising an organic functional metal oxide, a manufacturing method thereof, a membrane-electrode assembly including the same, and a fuel cell including the membrane-electrode assembly. The electrode improves catalyst performance and durability, can reduce the amount of a catalyst used and catalyst costs by enabling excellent current density and power density to be obtained even in a state that a relatively small amount of the catalyst is used through an increase in catalyst utilization and uniform dispersion of the catalyst, and improves performance in general and low humidification conditions.

The invention claimed is:

1. A manufacturing method of an electrode, the manufacturing method comprising the steps of:
preparing an electrode forming composition by adding catalyst particles supported on a support, a precursor of organic functional metal oxide nanoparticles, and an ionomer to a solvent; and
manufacturing the electrode by (i) coating the electrode forming composition, and (ii) drying the coated electrode forming composition to remove the solvent therefrom,
wherein organic functional metal oxide nanoparticles are formed on the support through a sol-gel reaction of the precursor during the step of manufacturing the electrode, and
wherein the precursor is a sulfide function silane compound such that the organic functional metal oxide nanoparticles have a sulfur (S)-containing organic functional group.

2. The manufacturing method of the electrode of claim 1, wherein (i) the ionomer has a sulfonic acid group capable of catalyzing hydrolysis of the precursor during the step of preparing the electrode forming composition, and (ii) the condensation of the hydrolyzed precursor is accelerated when the coated electrode forming composition is dried.

3. The manufacturing method of the electrode of claim 1, wherein the precursor is any sulfide functional silane compound selected from the group consisting of bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, and bis(4-trimethoxysilylbutyl)disulfide.

4. The manufacturing method of the electrode of claim 1, wherein the precursor is bis(3-triethoxysilylpropyl)tetrasulfide or bis(3-triethoxysilylpropyl)disulfide.

* * * * *